United States Patent
Tanaka

[19]

[11] Patent Number: 5,978,328
[45] Date of Patent: Nov. 2, 1999

[54] FOCUS CONTROL DEVICE TO PERFORM FOCUS CONTROL FOR A MULTI-LAYER RECORDING MEDIUM

[75] Inventor: Toshihisa Tanaka, Yokohama, Japan

[73] Assignee: Nikon Corporation, Tokyo, Japan

[21] Appl. No.: 08/934,811

[22] Filed: Sep. 22, 1997

[30] Foreign Application Priority Data

Sep. 20, 1996 [JP] Japan .................................. 8-250005

[51] Int. Cl.$^6$ ...................................................... G11B 7/09
[52] U.S. Cl. ...................................................... 369/44.27
[58] Field of Search .................................. 369/94, 44.32, 369/44.25, 44.27, 58, 54, 44.28, 44.29

[56] References Cited

U.S. PATENT DOCUMENTS

| | | | |
|---|---|---|---|
| 5,740,136 | 4/1998 | Tsutsui et al. | 369/44.27 |
| 5,754,507 | 5/1998 | Nishikata | 369/44.25 |
| 5,768,227 | 4/1997 | Baba | 369/44.32 |

*Primary Examiner*—Thang V. Tran

[57] ABSTRACT

A data recording and playback device to perform focusing control on each recording layer of a multi-layer recording medium having a plurality of recording layers. The data recording and playback device includes a focus control device having a focusing movement device to set a position of a light spot, which illuminates a data recording medium having a plurality of recording layers, with respect to a direction perpendicular to the data recording medium. A focus error signal forming device forms a focus error signal based on a relative displacement of the position of the light spot set by the focusing movement device and the recording surface of the medium. A position signal forming device forms a position signal based on a displacement of the focusing movement device in a direction perpendicular to the recording medium surface, the position signal forming device having a detection range wider than that of the focus error signal forming device. A control device forms a control signal at the time of a focus jump operation to move the light spot from a recording layer to a target recording layer based chiefly on the position signal, and forms a control signal to control the focusing movement device at the time of a focusing operation to move the light spot to follow a target recording layer based chiefly on the focus error signal.

7 Claims, 8 Drawing Sheets

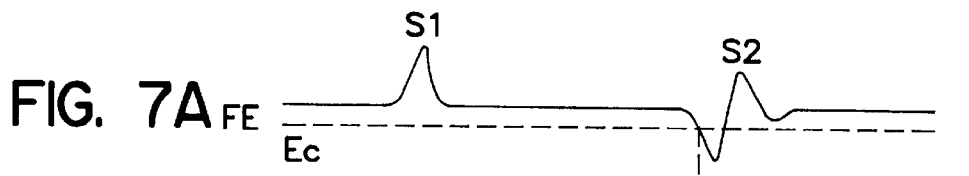
FIG. 7A FE
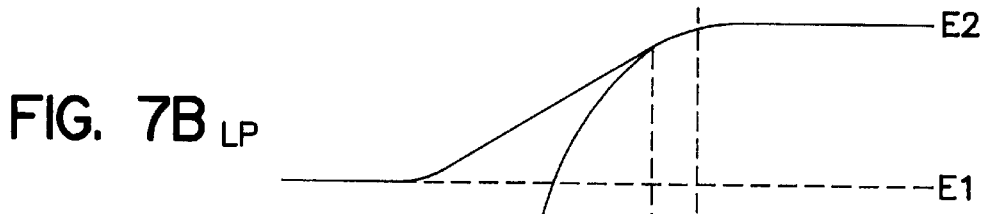
FIG. 7B LP
FIG. 7C
FIG. 7D
FIG. 7E
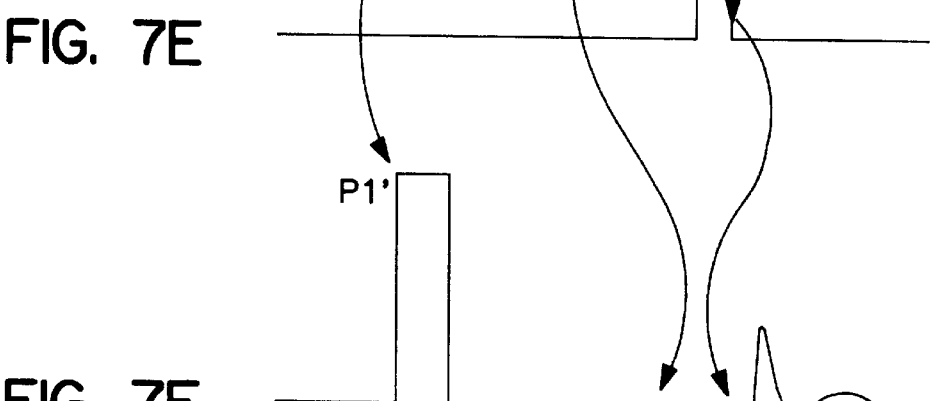
FIG. 7F
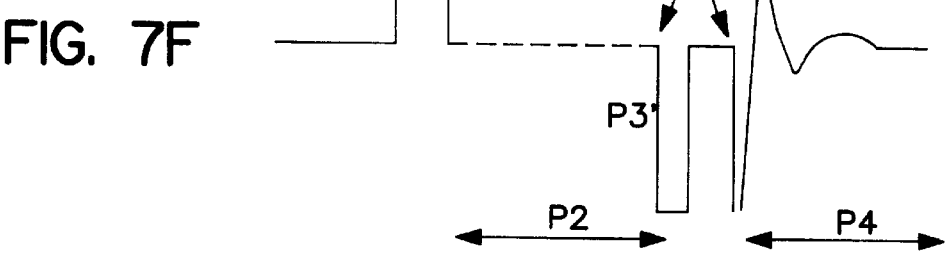

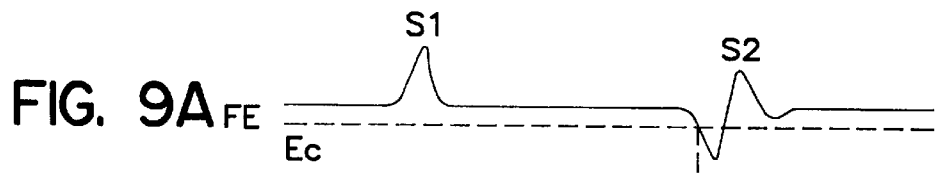
FIG. 9A
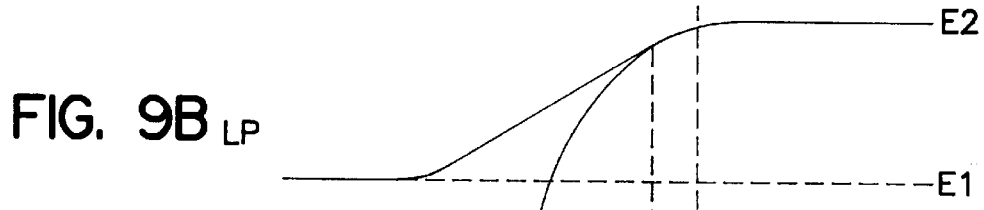
FIG. 9B
FIG. 9C
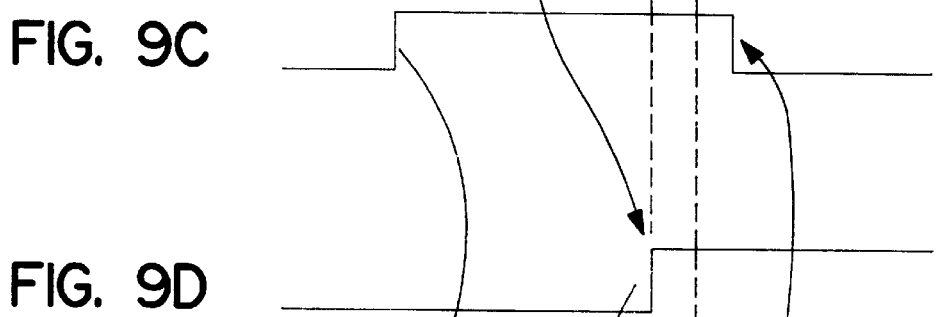
FIG. 9D
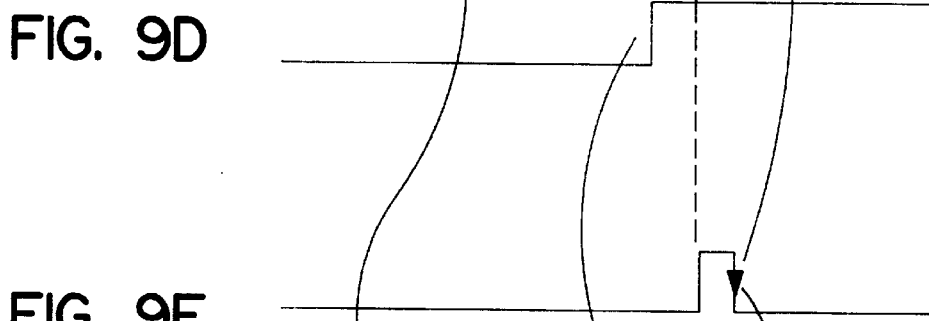
FIG. 9E
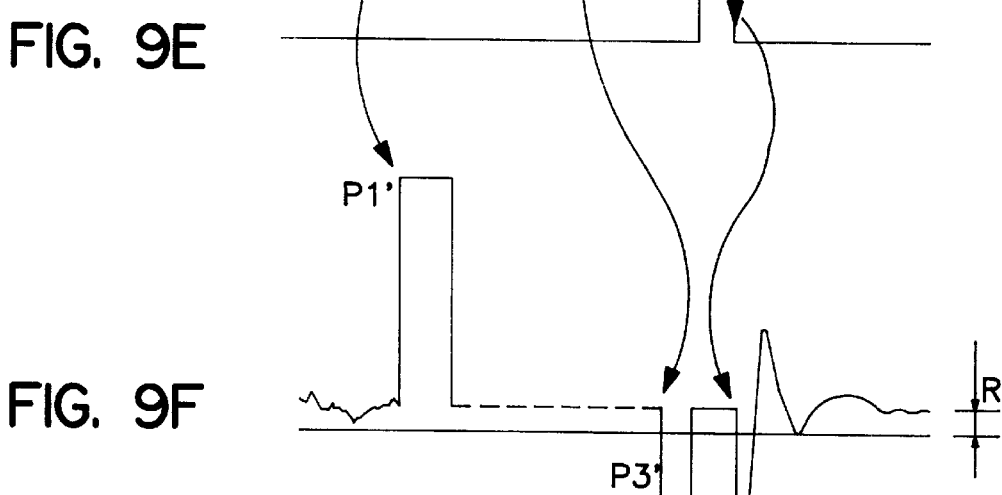
FIG. 9F
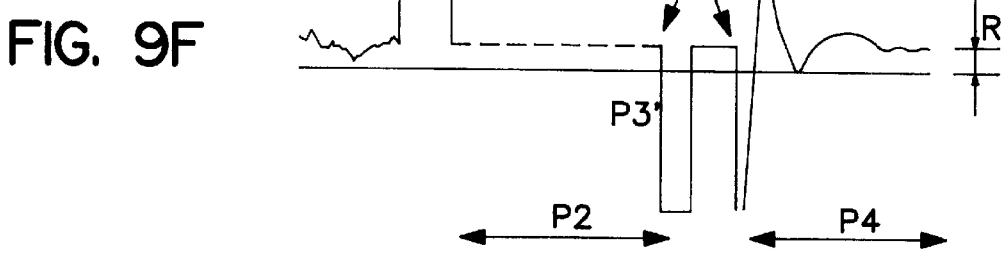

FOCUS CONTROL DEVICE TO PERFORM FOCUS CONTROL FOR A MULTI-LAYER RECORDING MEDIUM

CROSS-REFERENCE TO RELATED APPLICATIONS

This application is based upon and claims priority of Japanese Patent Application No. 08-250005, filed Sep. 20, 1996, the contents of which are incorporated herein by reference.

BACKGROUND OF THE INVENTION

1. Field of the Invention

The present invention relates to a focus control device for recording or playback of data from a recording medium such as a magneto-optic disk, an optical disk or the like, and, more particularly, the present invention relates to a focus control device to perform focus control with respect to a multi-layer recording medium having a plurality of recording layers.

2. Description of the Related Art

Devices are known for recording data on or playing back data recorded on a conventional type of magneto-optic disk, or the like data recording medium, using a condensed light beam to illuminate a recording surface of the recording medium. During recording or playback of data, focus control is performed such that the condensed light beam has a focus position on the recording surface of the medium.

Various attempts have been made to increase the data capacity of the magneto-optic data recording medium and the like data recording media. For example, one technique considered for attaining a higher data density on a data recording medium is to use multiple data recording layers. However, the focus control with the conventional data recording and playback device cannot be performed to correspond to each recording layer of a multi-layer recording medium because the prior art data recording and playback device has as its object of control a recording medium having a single recording layer.

Therefore, what is needed is a data recording and playback device to control focusing on each recording layer of a multi-layer recording medium.

SUMMARY OF THE INVENTION

It is an object of the present invention to solve the problems described above, and to provide a focus control device to control the focus on each recording layer of a multi-layer recording medium having a plurality of recording layers.

Objects and advantages of the present invention are attained with a focus control device, comprising a focusing movement device to set a position of a light spot, which illuminates a data recording medium having a plurality of recording layers, with respect to a direction perpendicular to the data recording medium; a focus error signal forming device to form a focus error signal based on a relative displacement of the position of the light spot set by the focusing movement device and the recording surface of the medium; a position signal forming device to form a position signal based on a displacement of the focusing movement device in a direction perpendicular to the recording medium surface, the position signal forming device having a detection range wider than that of the focus error signal forming device; and a control device to form a control signal at the time of a focus jump operation to move the light spot from a recording layer to a target recording layer based chiefly on the position signal, and to form a control signal to control the focusing movement device at the time of a focusing operation to move the light spot to follow a target recording layer based chiefly on the focus error signal.

In accordance with embodiments of the present invention, the control unit forms the control signal such that the polarity of the control signal based on the position signal is the same as the polarity of the control signal based on the focus error signal.

In accordance with embodiments of the present invention, the focus control device further comprises a sweep device to control the focusing movement device such that the light spot scans each of the plurality of recording layers of the recording medium, and a memory to store the position of the position signal, wherein the control unit forms the control signal at the time of a focus jump operation based on the value of the stored position signal, and stores in the memory the position signal at a timing which obtains a focus error signal corresponding to each recording layer.

In accordance with embodiments of the present invention, the focus control device further comprises a device to move the light spot during the focus jump operation toward an inner circumference of the data recording medium before the light spot is moved to the target recording layer.

In accordance with embodiments of the present invention, the focus control device further comprises a memory to store residual error conditions in which the light spot is in the state of following a track of a recording layer during a rising time of the device, wherein the control unit determines the residual error condition, based on a position signal obtained in a following state of the rising time of the device or on a drive current, stores the residual error condition in the memory, and forms the control signal at the time of a focus jump operation based on the stored data.

In accordance with embodiments of the present invention, the residual error condition of the following state is a spring force or frictional force of the focus actuator within the focusing movement device, gravitational force acting on the focus actuator, or a surface vibration change accompanying the rotation of the data recording medium.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 7A–7F are timing diagrams for a focus jump operation in accordance with embodiments of the present invention.

FIGS. 9A–9F are timing diagrams describing a correction of the spring force or gravitational force of the focus actuator in accordance with embodiments of the present invention.

DETAILED DESCRIPTION OF THE PREFERRED EMBODIMENTS

Figure 1:
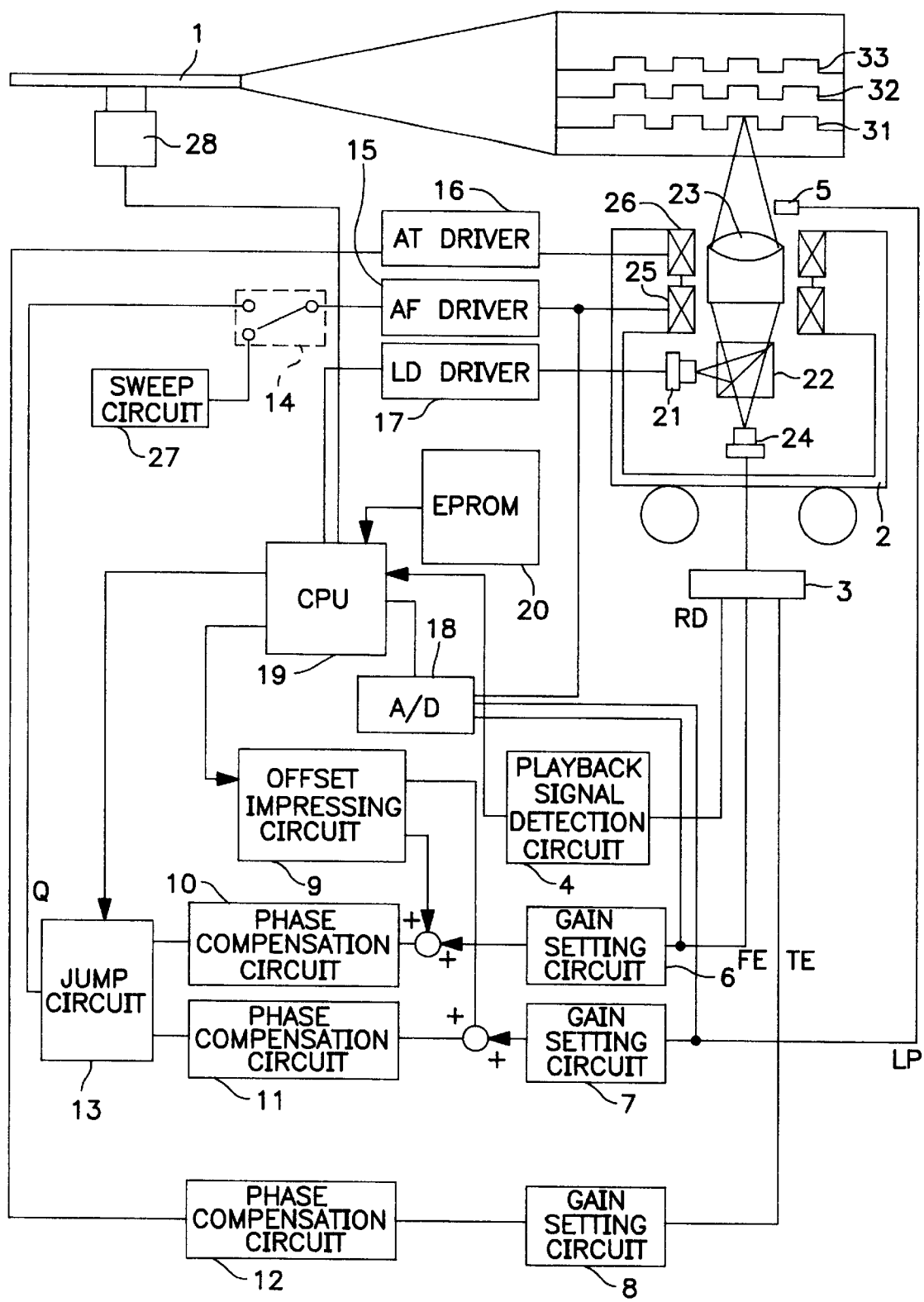
FIG. 1 is a block diagram of a data recording and playback device in accordance with embodiments of the present invention.

Reference will now be made in detail to the preferred embodiments of the present invention, examples of which are illustrated in the accompanying drawings, wherein like reference numerals refer to like elements throughout.

FIG. 1 is a block diagram of a data recording and playback device in accordance with a first embodiment of the present invention. As shown in FIG. 1, an optical head 2 emits laser light, which is incident on a data recording medium 1 having a plurality of recording layers 31, 32 and 33, and is movable in a radial direction of the data recording medium 1. The laser light emitted from the optical head 2 is emitted from a semiconductor laser 21, then reflected by a beam splitter 22, passed through an objective lens 23, and is incident on the recording medium 1 to form a light spot on the recording medium surface. The laser light illuminating the recording medium 1 is reflected from the recording medium 1, passes through the beam splitter 22 and is incident on a photodetector 24.

The photodetector 24 is divided into a plurality of light receiving units, and the light signal received by each respective light receiving unit of the photodetector 24 is output to a signal forming circuit 3. The photodetector 24 may be divided into, for example, four light receiving units.

The signal forming circuit 3 forms a focus error signal FE, a track error signal TE and a playback signal RD based on the received light signals. The focus error signal FE indicates the relative distance between the beam waist (focus position) of the laser light condensed by the objective lens 23 and the recording surface of the recording medium 1. The track error signal TE indicates a difference in radial position between the focus position of the laser beam and a track position. The playback signal RD represents data that is written on the recording medium 1.

The focus error signal FE has a shape referred to as an S curve. The track error signal TE has a sine waveform having a period corresponding to one (1) pitch unit of a data track. Moreover, the playback signal RD is obtained from a preformatted portion of the recording medium 1 and from a data portion written by the user. The playback signal RD is received by a playback signal detection circuit 4 which produces a digital value of a position (recording layer, track, sector, etc.) on the recording medium 1 that the laser light spot is following. The digital value of the position on the recording medium 1 followed by the laser light spot is transmitted from the playback signal detection circuit 4 to a central processing unit (CPU) 19.

Furthermore, it is possible that, according to the format of the recording medium 1, the recording layer number is not directly written (for example, in the case that the track number, sector number, etc. are allotted in sequence for each recording layer). However, if it is discriminated which recording layer of the recording medium 1 the laser spot is following based on an ID address and the format, the recording layer number can be determined.

The position of the objective lens 23 in a direction perpendicular to the recording medium 1 is detected by an objective lens position sensor 5. An objective lens position signal LP representing the position of the objective lens 23 in a direction perpendicular to the recording medium 1 is output from the objective lens position sensor 5.

The focus error signal FE and the objective lens position signal LP are input to gain setting circuits 6, 7, respectively. The gain setting circuits 6, 7 perform adjustment of the gain with respect to the input signals, and output an adjusted focus error signal FE and an adjusted lens position signal LP, respectively.

In order to control a focusing operation such that the laser illumination position follows the target recording layer of the recording medium 1, an offset impressing circuit 9 impresses an offset value on the focus error signal FE output from the gain setting circuit 6 to change the target value of control. Further, a focus jump operation, which will be described in detail hereinafter, adjusts the focus position of the laser 21 to move to a target recording layer by adding an offset value to the objective lens position signal LP output from the gain setting circuit 7 to change the target value of control. The resolution power of the offset added to the focus error signal FE is controlled by a voltage having a step size such that the movement amount of the objective lens 23 is preferably about 0.01 $\mu$m. Further, the resolution power of the offset added to the lens position signal LP is controlled by a voltage having a step size such that the movement amount of the objective lens 23 is preferably about 1 $\mu$m.

The focus error signal FE and the objective lens position signal LP with the respective offset values impressed by the offset impressing circuit 9 are input to a jump circuit 13 via phase compensation circuits 10, 11, respectively. The phase compensation circuits 10, 11 are filter circuits to confer stability on the control system, and output a filtered focus error signal FE and a filtered objective lens position signal LP, respectively. The jump circuit 13 outputs a control signal Q, which is an additive signal of the focus error signal FE and the objective lens position signal LP (to be described in detail hereinafter) to an AF driver 15 through one terminal of a switch 14 to control a focus jump operation. The AF driver 15 supplies drive current to a focus actuator 25 to drive the objective lens 23 in a direction perpendicular to the recording medium 1 (referred to hereinbelow as the "focus direction"). By driving the objective lens 23 in a direction perpendicular to the recording medium 1, the focus position of the laser illumination beam moves in a direction perpendicular to the recording medium 1, thereby controlling the focus operation.

In accordance with embodiments of the present invention, a focus servo loop comprises the gain setting circuits 6, 7, the phase compensation circuits 10, 11, the jump circuit 13, the switch 14, the AF driver 15 and the focus actuator 25.

A sweep circuit 27 is connected to another terminal of the switch 14 to input a signal to the AF driver 25 to drive the objective lens 23 to perform a sweep operation such that the laser light spot scans all of the layers of the recording medium 1 in the focus direction in order for focus pulling during the rise time of the device (i.e., when the power to the device is turned on).

A gain setting circuit 8 receives the track error signal TE and performs gain adjustment of the track error signal TE. A signal output from the gain setting circuit 8 is input to an AT driver 16 via a phase compensation circuit 12. The phase compensation circuit 12 performs filtering processing of the signal input from the gain setting circuit 8. The AT driver 16 provides drive current to the tracking actuator 26 to drive the objective lens 23 in a radial direction (referred to hereinbelow as the "tracking direction") of the recording medium 1. In the above-described manner, tracking control is performed, and the illumination position of the optical head 2 follows a track of the recording medium 1.

In accordance with embodiments of the present invention, a tracking servo loop comprises the gain setting circuit 8, the phase compensation circuit 12, the AT driver 16 and the tracking actuator 26.

Moreover, a control loop of the present invention includes a carriage (not shown) to determine the position of the optical head 2 in the radial direction, the gain setting circuit 8, the phase compensation circuit 12, and a carriage driver (not shown). The tracking actuator 26 and the carriage together perform a seeking operation in the radial direction of the recording medium. In accordance with the present invention, the data recording and playback device also includes circuits which perform, during seeking, the detection of movement speed from the count of the track grooves of the recording medium and the groove crossing time.

The movement of the focus position light beam between recording layers will now be described with respect to the recording medium 1 having a plurality of recording layers. In accordance with embodiments of the present invention, the recording medium preferably includes three (3) recording layers. However, the present invention is not limited to three recording layers, and two, four, or more recording layers may be provided.

Initially, the CPU 19 of the data recording and playback device recognizes, when a data recording medium 1 is loaded into the device, that the recording medium 1 is a multi-layer recording medium having a plurality of recording layers. The recognition that the data recording medium 1 is a multi-layer recording medium is made by reading a detection hole or a bar code disposed on the cartridge of the recording medium 1. This recognition causes reading out of data of an information area recorded in the first layer of the recording medium 1. In accordance with embodiments of the present invention, a recording layer 31 closest to the optical head 2 is referred to as the first layer 31. However, the recording layer furthest from the optical head 2 may also be taken as the first layer.

Next, the data recording and playback device rotates the recording medium 1 with a spindle motor 28, and the optical head 2 is moved by the carriage in the radial direction of the recording medium 1. The movement end of the optical head 2 is position controlled at intermediate circumferential positions by a photo-interruptor (not shown), or the like position detector, located in a position with respect to the mounting base (not shown) of the carriage and the spindle motor 28.

The CPU 19 then controls the LD driver 17 to drive the semiconductor laser 21 to emit light to generate a laser spot to illuminate the recording medium surface via the objective lens 23. At this time, the switch 14 selects the output of the sweep circuit 27 (the focus servo is in the OFF state), and the sweep circuit 27 provides voltage values to the AF driver 15 in accordance with a predetermined drive pattern. By providing voltage values to the AF driver 15, current is supplied to the focus actuator 25, and the objective lens 23 is driven to sweep in the focus direction in accordance with the predetermined drive pattern.

Figure 2A:
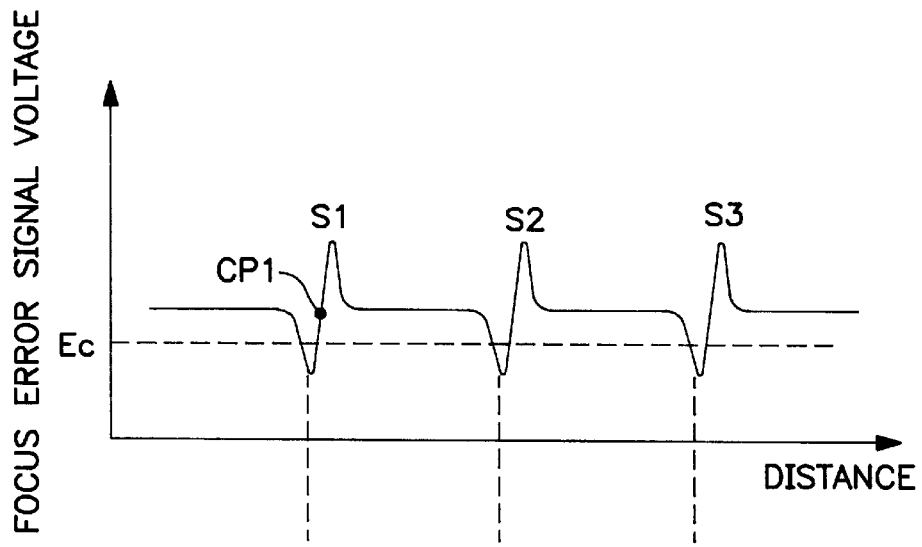
FIGS. 2A–2C are graphs of signal waveforms of a focus error signal, an objective lens position signal and a digitized focus error signal in accordance with embodiments of the present invention.

When the objective lens 23 sweeps in the focus direction in the above-described manner, a focus error signal FE is obtained. As shown in FIG. 2A, which is a graph of focus error signal voltage versus distance between the objective lens 23 and the recording medium 1, the focus error signal FE includes three focus S-shaped curves S1–S3 (unbroken line in FIG. 2A) which respectively correspond to the three (3) recording layers 31–33 of the recording medium 1.

Figure 2B:
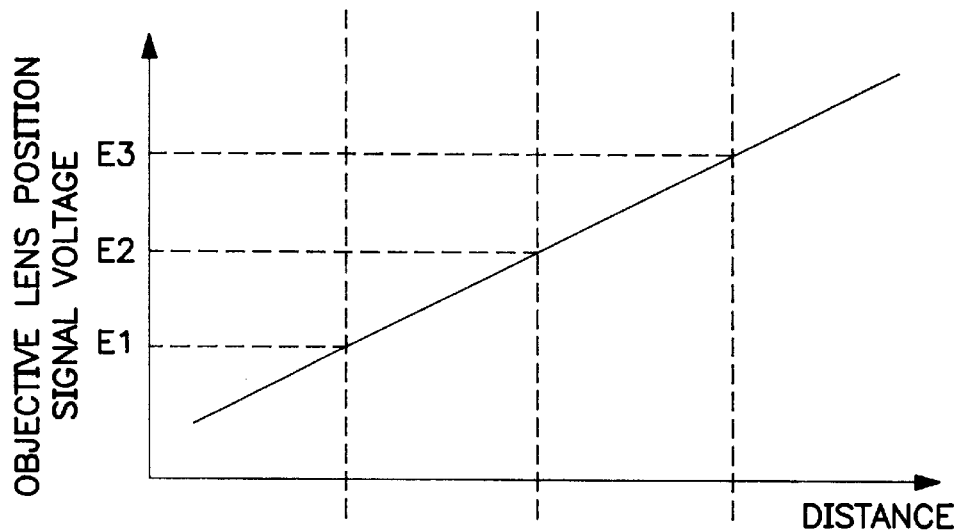

FIG. 2B illustrates an objective lens position signal LP obtained when the focus error signal FE of FIG. 2A is generated. As shown in FIG. 2B, the objective lens position signal LP increases monotonically according to the movement of the objective lens 23. Furthermore, as noted above, the abscissa in FIGS. 2A and 2B represents the distance between the objective lens 23 and the recording medium 1. The distance represented on the abscissas in FIGS. 2A and 2B decreases moving from left to right as objective lens 23 moves closer to the recording medium 1.

Figure 2C:
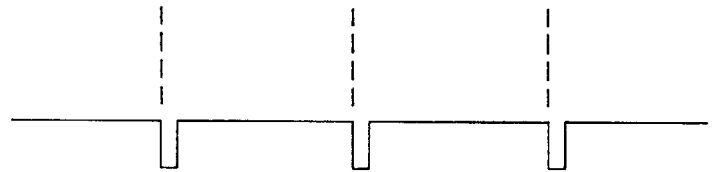

When the focus error signal FE shown in FIG. 2A is digitized by comparison with a threshold value Ec, the digitized signal shown by FIG. 2C is obtained. An A/D converter 18 samples and holds the objective lens position signal LP at a timing corresponding to the digitized focus error signal shown in FIG. 2C, and converts the objective lens position signal LP to a digital value. In the above-described manner, three (3) values E1–E3 of the objective lens position signal LP can be obtained, respectively, corresponding to the three (3) recording layers 31–33 of the recording medium 1. The values E1–E3 are stored in an EPROM 20 via the CPU 19. Furthermore, by repeating the sweep of the objective lens 23 a number of times and acquiring a plurality of values for E1–E3, average values for the objective lens position signals may be obtained and stored.

Next, focus pulling to the first recording layer 31 of the recording medium 1 is performed. Focus pulling to the first recording layer 31 is similar to focus pulling for a normal single layer recording medium. More particularly, while monitoring the level of the whole light amount signal, when focus is pulled close to the recording surface (i.e., close to the control point CP1 of the focus error signal FE shown in FIG. 2A), the state of the switch 14 is changed such that the output of the sweep circuit 27 is no longer input to the AF driver, and the output of the jump circuit 13 is now input to the AF driver 15. The focus servo loop is thereby placed in the ON state. Track control is then performed using the track error signal TE obtained from the track of the recording layer 31. Moreover, double servo control which drives the carriage is conjointly performed using the low frequency components of the track error signal TE. The above control state comprises a block following state.

The CPU 19 then determines a residual error condition in a state of following a track of the recording medium 1, and stores the residual error condition in the EPROM 20.

Figure 3A:
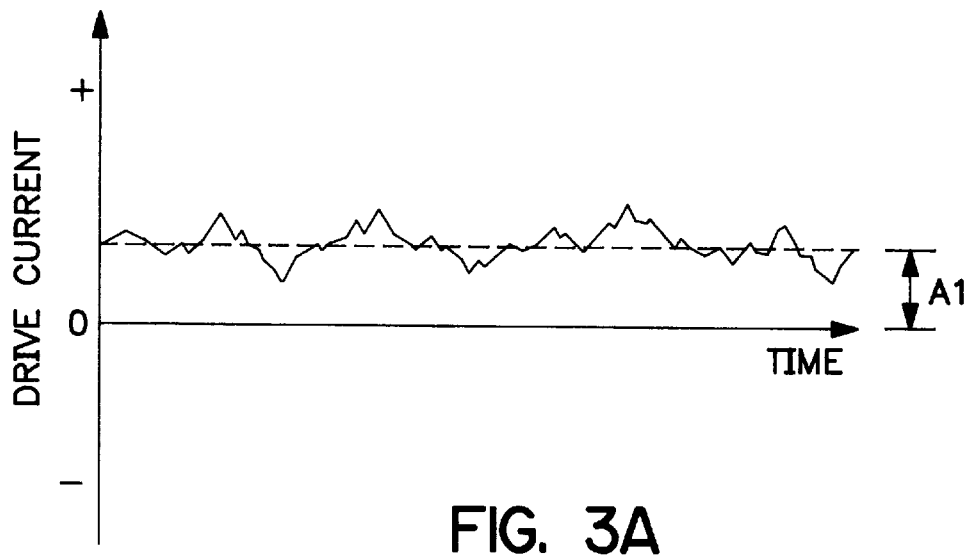
FIGS. 3A and 3B are graphs illustrating drive current waveforms of an AF driver in accordance with embodiments of the present invention.
Figure 3B:
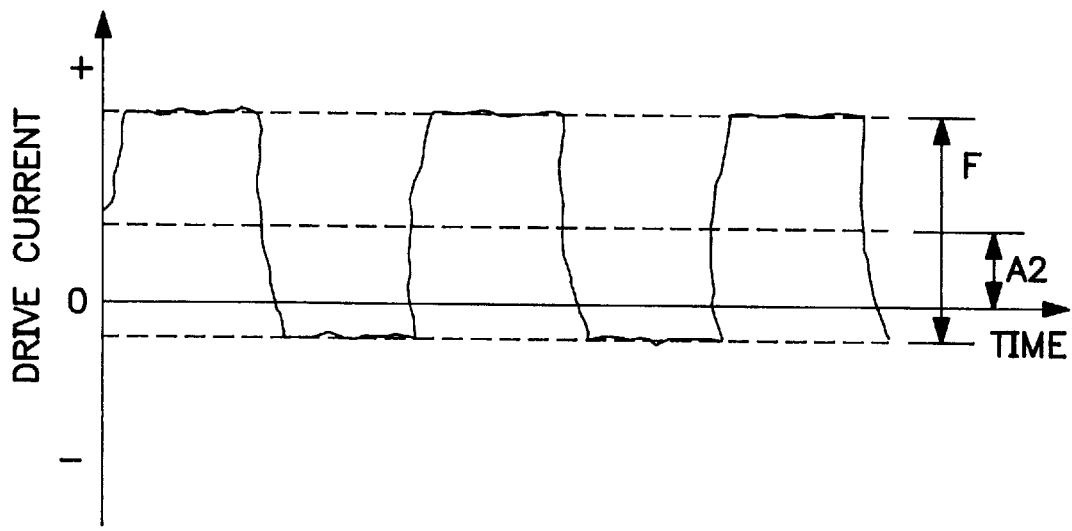

FIGS. 3A–3B are graphs illustrating the drive current of the AF driver 15 in the track following state. More particularly, FIG. 3A illustrates the drive current flowing to the focus actuator 25 from the AF driver 15 when the focus actuator 25 is in a mode maintaining the objective lens 23 with a spring, such as a plate spring (not shown). Further, FIG. 3B illustrates the drive current flowing to the focus actuator 25 from the AF driver 15 when the focus actuator 25 is in a frictional force axial sliding motion mode.

In the case that the focus actuator 25 is maintaining the objective lens 23 with a spring, the CPU 19 finds its DC component (average value) A1 from the drive current shown in FIG. 3A, which has been digitized by the A/D converter 18. The DC component A1 corresponds to the spring force of the focus actuator 25.

Moreover, in the case of that the focus actuator 25 is in the frictional force axial sliding motion mode, the CPU 19 determines the peak-to-peak value F and also the DC component (average value) A2 from the drive current shown in FIG. 3B, which has been digitized by the A/D converter 18. Moreover, in this case, the drive current is filtered with a low-pass filter (not shown) having a cutoff frequency of about ten (10) times the disk rpm, and the output of the low-pass filter is input to the A/D converter 18. As shown in FIG. 3B, the peak-to-peak value F corresponds to the frictional force of the focus actuator 25, the DC component A2 corresponds to the gravitational force on the focus actuator 25. The values obtained in above-described manner are written into the EPROM 20. By acquiring such values, it is possible to predict the acceleration information acting in the focus direction.

Figure 4A:
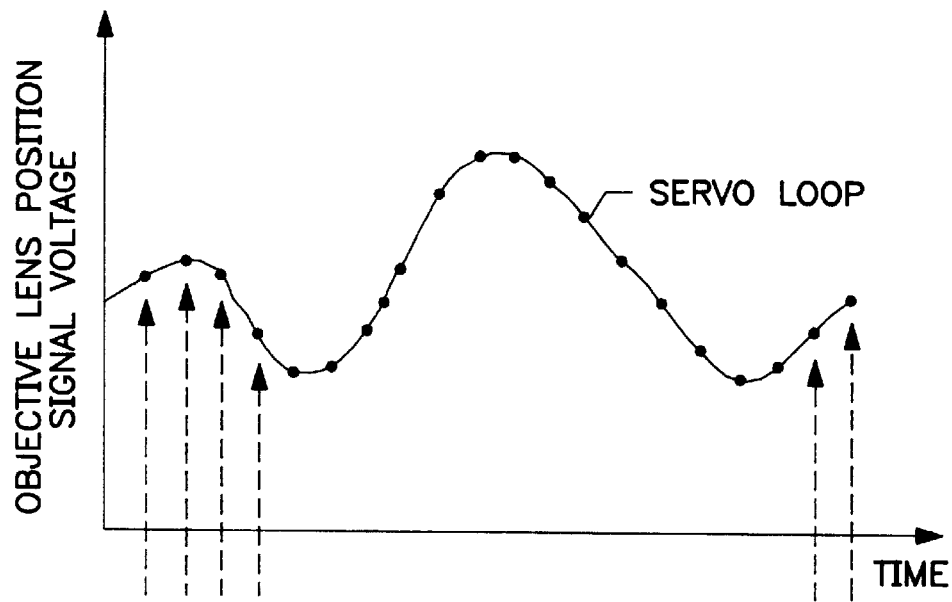
FIGS. 4A and 4B are diagrams describing the acquisition of an objective lens position signal of a recording medium rotation portion in accordance with embodiments of the present invention.
Figure 4B:
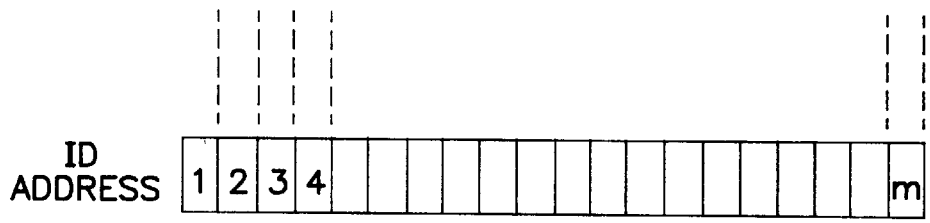

Moreover, the A/D converter 18 acquires an objective lens position signal LP corresponding to a recording medium 1 rotation portion, and converts the objective lens position signal to a digital value. By acquiring the objective lens position signal LP of a recording medium 1 rotation portion, it is possible to predict the surface vibration change accompanying the rotation of the recording medium 1. As shown in FIG. 4A, the objective lens position signal LP is sampled at predetermined times to produce an A/D converted digital value. As shown in FIG. 4B, an ID address read out from the recording medium 1 may be used as a sampling trigger for the objective lens position signal LP. Further, an FG signal which governs the rotation control of the spindle motor 28 may be used as a sampling trigger for the objective lens position signal LP. The digitized values of the objective lens position signal which are output by the A/D converter 18 are stored in the EPROM 20 via the CPU 19.

The focus jump from the first recording layer 31 to the second recording layer 32 will now be described below with reference to FIG. 5, which is a flow chart showing an operational process for performing a focus jump operation.

Beginning in step 101, the recording layer that is presently being followed is discriminated by, for example, discriminating a layer address at the present position. Next, in step 102, it is determined whether or not the recording layer presently being followed is the target recording layer. At this time, since the laser spot is following the recording layer 31 and the recording layer 32 is the target layer, the determination in step 102 is NO. The operational process then proceeds to step 103, and the number of layers to move the focus position to reach the target layer is set. In accordance with the example described herein, because the focus jump is from recording layer 31 to recording layer 32, the number of layers to move the focus position is one (1) layer.

Continuing, in step 104, the present position in the radial direction of the recording medium 1 which the laser spot is following is confirmed. The position in the radial direction is determined by reading out the ID address written on the recording medium 1. Then, in step 105, it is decided whether the position of the laser spot is one at which a focus jump is possible.

To perform a stable focus jump, it is important to perform the focus jump when the recording medium 1 has a surface vibrational acceleration that is as small as possible. As described above, the surface vibration of the recording medium 1 is stored in the EPROM 20 as compensation data, and does not agree with the surface vibrational acceleration. However, the small surface vibrational acceleration is suppressed without error in the direction of the inner circumference of the recording medium 1. Consequently, the position at which a focus jump is possible is set from the innermost circumference of the recording medium 1. If the actual position of the laser light spot is separated from the position at which focus jump is possible, a seek operation is performed to move the optical head 2 to the innermost circumference of the recording medium 1 by moving the carriage (step 106). Then, on reaching the position at which a focus jump is possible, a focus jump is performed (step 107).

Figure 6A:
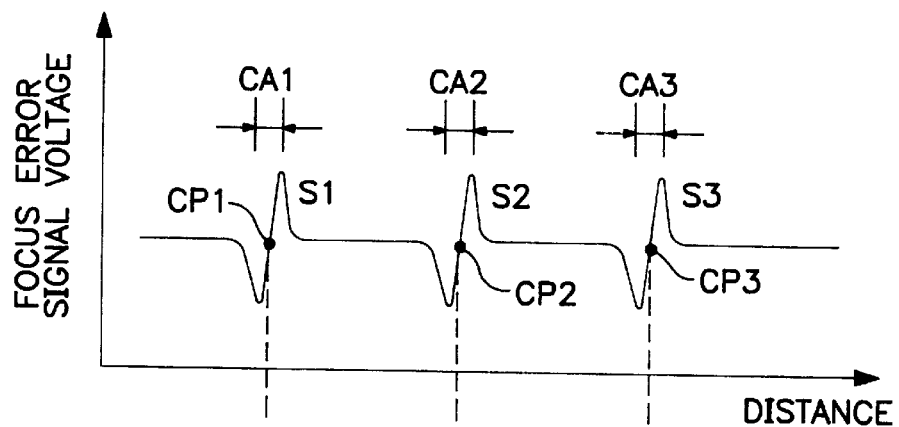
FIGS. 6A–6C are graphs of signal waveforms of a focus error signal, an objective lens position signal and an additive signal used to describe a focus jump operation in accordance with embodiments of the present invention.

In accordance with the embodiments of the present invention, as described above, the number of recording layers of the recording medium 1 is three (3), and a focus error signal FE is obtained which has three (3) S-shaped curves S1–S3 corresponding to the three (3) recording layers 31–33 of the recording medium 1. As shown in FIG. 6A, a control effective range CA1–CA3 of the focus error signal FE is limited to a 10–20 $\mu$m portion centered on the control points CP1–CP3 in the respective S-shaped curves S1–S3. When focus pulling is not performed within the effective ranges CA1–CA3, focus control cannot be accurately performed.

Figure 6B:
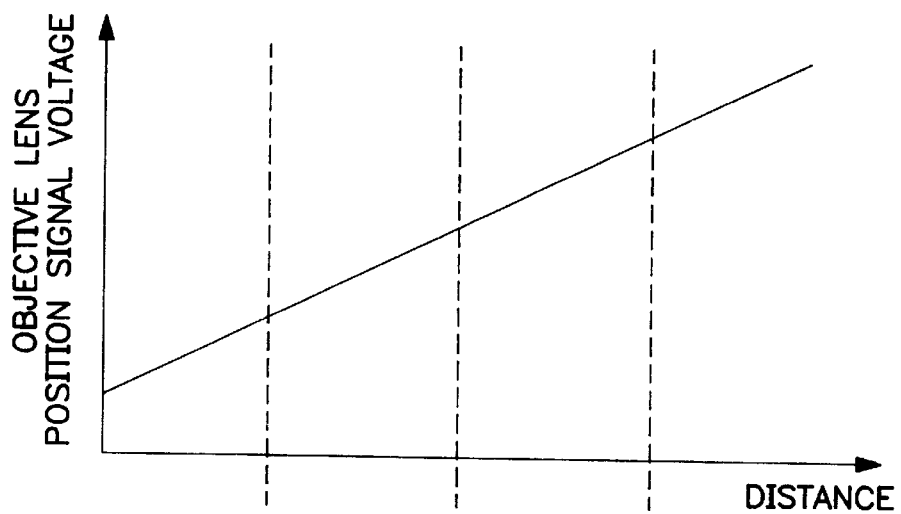

The objective lens position sensor 5 detection range is wide in comparison with the range of focus error detection. As shown in FIG. 6B, the objective lens position signal LP output from the position sensor 5 has a control gradient corresponding to a full scale working range of the objective lens 23 of 1-2 mm.

Figure 6C:
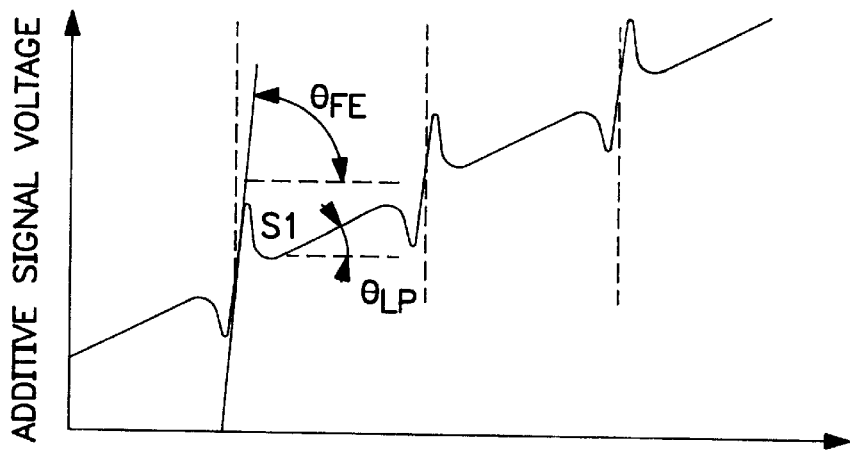

The jump circuit 13 forms a signal Q, as shown in FIG. 6C, which is additive of the focus error signal FE and the objective lens position signal LP which pass through the respective phase compensation circuits 10, 11. Furthermore, in FIGS. 6A–6C, the abscissa represents the distance between the objective lens 23 and the recording medium 1 such that moving in the right-hand direction on the abscissa the objective lens 23 moves closer to the recording medium 1.

As shown in FIG. 6C, the additive distribution of the focus error signal FE and the objective lens position signal LP (i.e., the gain distribution) becomes 1:1. However, the jump circuit 13 takes the additive distribution of the focus error signal to be large at the time of focusing control. Further, the jump circuit takes the additive distribution of the objective lens position signal LP to be large at the time of focus jump. For example, at the time of focusing control, the jump circuit 13 determines that the additive distribution of the focus error signal FE and objective lens position signal LP is preferably 10:1. Further, for example, at the time of focus jump, the jump circuit determines that the additive distribution of the focus error signal FE and the objective lens position signal LP is preferably 1:10. However, it is noted that the additive distribution of focus error signal FE and objective lesn position signal LP is not limited to the above distribution, and other distributions are possible.

At this time, the additive signal Q is formed and provided to the AF driver 15, and the slope $\theta$ FE of the focus error signal FE and the slope $\theta$ LP of the objective lens position signal LP have the same polarity. In the above-described manner, it is not necessary to change the polarity of the servo loop according to whether a focusing operation is performed or a focus jump operation is performed. Control can be performed continuously in the same servo loop, and wasteful switching between different servo loops is eliminated.

The operation of performing a focus jump using the additive signal Q from the jump circuit 13 will now be described below with reference to FIGS. 7A–7F which are timing diagrams illustrating the focus jump operation.

When the determination in step 105 is that a position has been reached at which a focus jump is possible, the CPU 19 issues a jump instruction signal having an "H" level, as shown in FIG. 7C. In response to the jump instruction signal, the jump circuit 13 outputs a drive pulse P1 as an additive signal Q for the laser spot which is to escape from the state (focusing control) of following the recording layer 31. The drive pulse P1 thus formed has a value, for example, between the values E1 and E2 of the objective lens position signal LP which is stored in the EPROM 20.

In response to the output of the drive pulse P1, a drive current having a pulse P1', as shown in FIG. 7F, is supplied from the AF driver 15 to the focus actuator 25. The output of the pulse P1' controls the objective lens 23, which was producing a laser spot following the recording track 31, to move toward the recording track 32.

Next, when a focus jump operation is initiated in response to a jump instruction signal becoming the "H" level, the offset impression circuit 9 repeatedly impresses an offset value on the objective lens position signal LP (FIG. 7B) output from the gain setting circuit 7, and the target value of the control is successively changed from the E1 level of the recording layer 31 to the E2 level of the recording layer 32.

Moreover, the CPU 19 effects correction of the surface vibration of the recording medium 1 in accordance with data of the objective lens position signal LP of the recording medium 1 rotation portion which was stored in the EPROM 20 by performing the correction of the objective lens position signal LP in the jump circuit 13.

Figure 8:
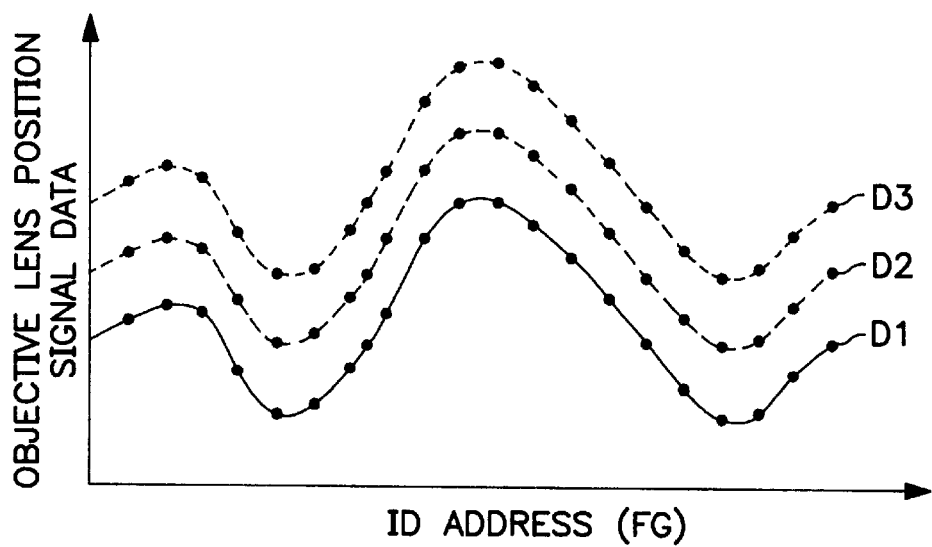
FIG. 8 is a diagram to describe surface vibration correction in accordance with embodiments of the present invention.

FIG. 8 is a graph illustrating the surface vibration correction in accordance with the embodiments of the present invention. As shown in FIG. 8, the data D1 corresponds to the objective lens position signal LP stored in the EPROM 20 corresponding to an ID address. Furthermore, the data D1 corresponds to the recording layer 31; however, because the layers 31–33 are laminated at a predetermined interval, the data D2 corresponding to the recording layer 32, and the data D3 corresponding to the recording layer 33 can be inferred (extrapolated) from the data D1.

The relationship between the data D1–D3 and the FG signal can also be used to control storage of the data D1–D3, instead of the relationship between the ID address(es) and the data D1–D3. The CPU 19 then instructs storage of the relationship between the data D1–D3 and the FG signal in tabular form in the EPROM 20.

Next, the CPU 19 controls the jump circuit 13 to perform correction of the objective lens position signal LP by looking up the data D2 in the previously prepared table based on the value of the actual FG signal. The surface touch change of the recording layer 32 (data D2) is predicted, which is the jump target when the FG signal is obtained. In this manner, surface vibration correction of the recording medium 1 can be carried out.

Further, when the jump circuit 13 performs the focus jump operation, the jump circuit 13 takes the additive distribution of the objective lens position signal LP to be large.

Furthermore, as shown in FIG. 7F, the drive current is indicated by a broken line spanning the interval P2 separating the recording layer 31 toward the recording layer 32. However, in accordance with the above-described operation, the additive signal Q is output from the jump circuit 13, and a drive current corresponding to the additive signal Q is supplied to the focus actuator 25.

Next, as shown in FIG. 7D, the CPU 19 changes a focus control permission signal to the "H" level when the level of the objective lens position signal LP is close to E2, which is stored in the EPROM 20 in the manner described above. That is, the level which the S-shaped focus error signal reveals corresponds to the recording layer 32. This is a signal to decide the S-shaped curve S2 of the target recording layer 32 and the S-shaped curve S1, S3 of the other recording layers.

Corresponding to the output of the focus control permission circuit, the jump circuit 13 outputs a drive pulse P1 and a reverse polarity drive pulse P3 as the additive signal Q to control the movement of the objective lens 23. The management of the drive pulse P3 is similar to the drive pulse P1. As shown in FIG. 7F, the output of the drive pulse P3 produces a drive current having a pulse P3' which is supplied to the focus actuator 25 from the AF driver 15.

Continuing, when the S-shaped curve S2 of the recording layer 32 appears in the focus error signal FE (as shown in FIG. 7A) which is acquired via the A/D converter 18, the CPU 19 outputs a focus control ON instruction signal (as shown in FIG. 7E) at the timing of the focus error signal FE digitized by the threshold value Ec (FIG. 2C). When the focus control ON instruction signal is output and the focusing operation is performed, the jump circuit 13 takes the additive distribution of the focus error signal FE as large among the focus error signal FE and the objective lens position signal LP. In the above-described manner, pulling to the focus control point of the recording layer 32 ends, and the focus jump ends. In the operations thereafter, the additive signal Q is output based on the focus error signal FE, and a drive current corresponding to the focus error signal is supplied to the focus actuator 25 (interval P4 of FIG. 7F).

Figure 5:
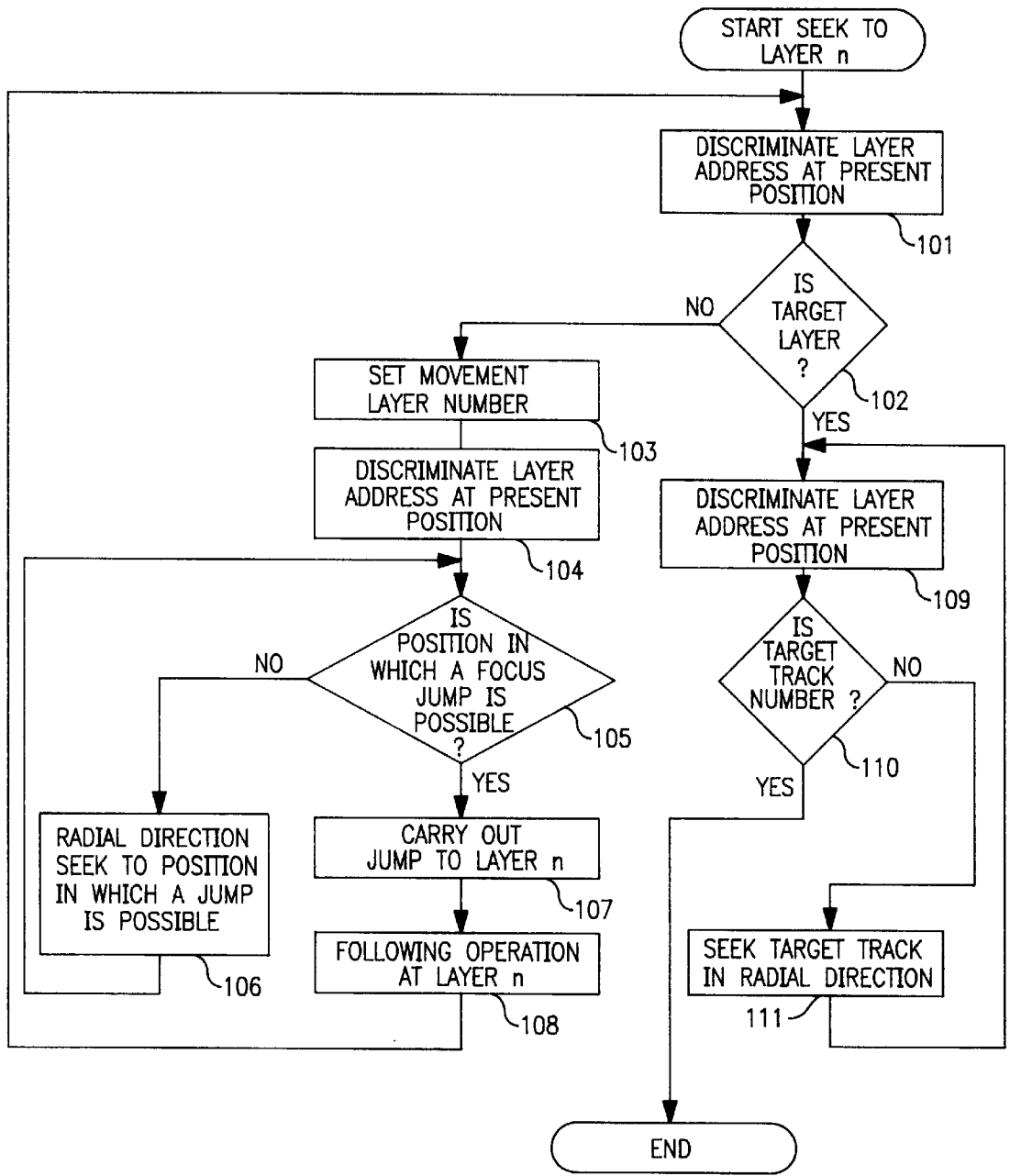
FIG. 5 is a flow chart illustrating an operational process for performing a focus jump operation in accordance with embodiments of the present invention.

After ending the focus jump to the recording layer 32, the present track is discriminated according to the ID address (step 109 of FIG. 5). If the present track is not the target track, seeking of the target track is performed (step 111). If the present track is the target track, seeking within the layer ends.

Furthermore, in performing control as described above, the CPU 19 can correct for the spring force and frictional force of the focus actuator 25, and the gravitational force acting on the focus actuator 25. More particularly, the CPU 19 determines the spring force and frictional force of the focus actuator 25, and the gravitational force acting on the focus actuator 25, from the value of the drive current stored in the EPROM 20. Based on the values of the spring force, the frictional force and the gravitational force, the CPU 19 issues instructions to the jump circuit 13 so as to correct for these forces.

To correct for the spring force, the frictional force and the gravitational force, as shown in FIG. 9F, a control amount R is added to or subtracted from the drive current of FIG. 7F supplied to the focus actuator 25. Proceeding in this manner, a suitable drive current can be supplied to the focus actuator 25 to correct the spring force and frictional force of the focus actuator 25, and the gravitational force acting on the focus actuator 25.

Moreover, in accordance with embodiments of the present invention, the playback signal detection circuit 4, gain setting circuits 6–8, offset impressing circuit 9, the phase compensation circuits 10–12, the jump circuit 13, the CPU 19, the sweep circuit 27 and the like hardware may be functionally embodied using a digital signal processor (DSP).

In accordance with embodiments of the present invention described hereinabove, focus control can be applied to each recording layer of a data recording medium having a plurality of recording layers, and movement between the recording layers can be rapidly accomplished. As a result, a recording and playback device can be realized having a large capacity and fast recording and playback speeds.

In accordance with embodiments of the present invention described hereinabove, by forming a control signal such that the polarity of a signal based on the focus error signal and the polarity of a signal based on the position signal are the same, it is not necessary to change the polarity of the servo loop which corresponds to the focusing operation or the focus jump operation. Accordingly, because control is performed continuously by the same servo loop, wasteful changing between servo loops is eliminated.

Moreover, in accordance with embodiments of the present invention, control signals for controlling movement to a target layer can be easily formed by storing position signals at a timing at which a focus error signal corresponding to respective recording layers is obtained. Accordingly, a recording layer which cannot be discriminated by the focus error signal obtained resembling an S-shaped curve in each recording layer, can be easily discriminated based on the value of the stored position signal and the actual position signal.

Furthermore, in accordance with embodiments of the present invention, during a focus jump operation, by moving the light spot toward the inner circumference of the data recording medium before the light spot begins to move to the target recording layer, the focus jump can be carried out at the inner circumference where the surface vibration acceleration is small. As a result, stabilized between layer movement can be performed.

Moreover, in accordance with embodiments of the present invention, by storing the residual error conditions determined based on the position signal obtained in the following state of the device rise time or the drive current, control signals can be formed, and the residual error conditions of the following state can be corrected. As a result, between layer movement can be reliably performed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A focus control device, comprising
   a focusing movement device to set a position of a light spot illuminating a data recording medium having a plurality of recording layers, with respect to a direction perpendicular to the data recording medium;
   a focus error signal forming device to form a focus error signal based on a relative displacement of the position of the light spot set by the focusing movement device and the recording surface of the medium;
   a position signal forming device to form a position signal based on a displacement of the focusing movement device in a direction perpendicular to the recording medium surface, the position signal forming device having a detection range wider than that of the focus error signal forming device; and
   a control device to form a control signal at the time of a focus jump operation to move the light spot from a recording layer to a target recording layer based chiefly on the position signal, and to form a control signal to control the focusing movement device at the time of a focusing operation to move the light spot to follow a target recording layer based chiefly on the focus error signal.

2. A focus control device as recited in claim 1, wherein the control device forms the control signal such that the polarity of the signal based on the position signal is the same as the polarity of the signal based on the focus error signal.

3. A focus control device as recited in claim 1, further comprising:
   a sweep device to control the focusing movement device such that the light spot scans each of the recording layers of the recording medium; and
   a memory to store the position signal,
   wherein the control unit forms the control signal at the time of a focus jump operation based on the value of the stored position signal, and stores the position signal in the memory at a timing which obtains a focus error signal corresponding to each recording layer.

4. A focus control device as recited in claim 1, further comprising:
   a device to move the light spot toward an inner circumference of the data recording medium during a focus jump operation before the light spot is to the target recording layer.

5. A focus control device as recited in claim 1, further comprising:
   a memory to store residual error conditions in which the light spot is in the state of following a track of a recording layer during a rising time of the device, wherein
   the control unit determines the residual error condition based on a position signal obtained in a following state of the rising time of the device or on a drive current, stores the position signal in the memory, and forms the control signal at the time of a focus jump operation based on the stored data.

6. A focus control device as recited in claim 5, wherein the residual error condition of the following state is a spring force or frictional force of the focus actuator within the focusing movement device, gravitational force acting on the focus actuator, or a surface vibration change accompanying the rotation of the data recording medium.

7. A focus control device for an optical data recording medium having a plurality of recording layers, comprising:
   an illuminating device to illuminate the optical data recording medium with a light spot, the illuminating device including a lens to focus the light spot on the recording medium; and
   a control device to control focusing of the light spot on a recording layer of the recording medium and to control a focus jump of the light spot from a first recording layer to a second recording layer of the recording medium, the control device including
   a lens position sensor to detect a position of the lens with respect to the recording medium,
   a focus error detection device to detect a relative displacement of a focus position of the light spot on a recording layer and the recording layer, and
   a focusing device to control movement of the light spot from the first recording layer to the second recording layer based primarily on a position detected by the lens position sensor, and to control focusing of the light spot on the recording layer based primarily on the displacement detected by the focus error detection device.

* * * * *